Aug. 30, 1927.

W. C. STARKEY

FRICTION CLUTCH

Filed Dec. 12, 1925

1,640,472

INVENTOR.
WILLIAM CARLETON STARKEY

BY

ATTORNEY.

Patented Aug. 30, 1927.

1,640,472

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

FRICTION CLUTCH.

Application filed December 12, 1925. Serial No. 74,957.

This invention relates to a helical spring adapted to be used to clutch together for rotation in one direction two relatively rotatable members provided with alined axial recesses in which the spring is received. Springs for this purpose are old, one application for such a spring being shown in United States Letters Patent No. 1,006,500, issued to Erick B. Peterson, on friction clutch.

It is the object of my invention to produce a spring of this type which will possess certain advantages over springs heretofore used. More specifically, it is the object of my invention to provide for the better lubrication of such a spring and to insure that the spring turns will not separate axially of the spring.

I accomplish the above object by forming my spring of round wire which has been flattened as by passing it between rolls, and I wind my spring so that the flat faces of one spring-turn abut against the flat faces of the adjacent spring-turns; and after winding the spring, I finish its exterior surface as by grinding, but I do not remove entirely the rounded outer surface of each spring turn, with the result that on the exterior surface of the spring the spring turns are separated by shallow V-shaped grooves.

Figure 1:
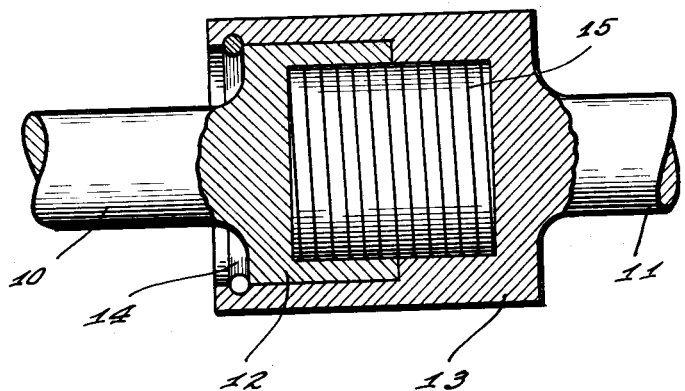
Figure 2:
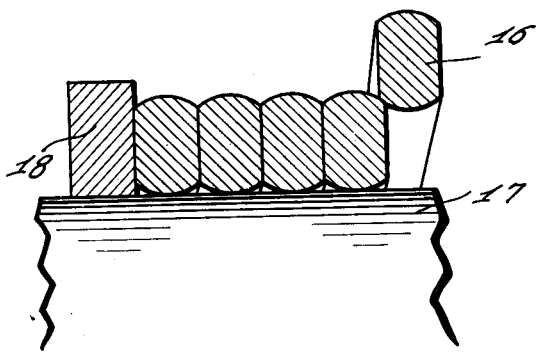
Figure 3:
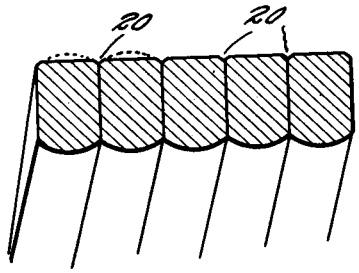

The accompanying drawing illustrates one embodiment of my invention: Fig. 1 is a fragmental longitudinal section through a clutch of the type in which my improved spring may be used; Fig. 2 is a longitudinal section of my spring in the process of being wound; and Fig. 3 is a longitudinal section of my spring after its exterior surface has been finished.

I have illustrated my spring as adapted to connect two relatively rotatable, co-axial shafts, although it will be evident that the spring may be used to connect other relatively rotatable members. As shown, the two shafts 10 and 11 are provided with enlarged ends which form respectively cups 12 and 13, the cup 13 being counter-bored for the reception of the cup 12. The cup 13 extends longitudinally beyond the cup 12 and is provided interiorly with an annular groove for the reception of a split spring ring 14 which bears against the back of the cup 12 and holds it in place in the counter-bored portion of the cup 13.

The cups 12 and 13 are provided with alined axial recesses within which is received a helical spring 15. The spring 15 is wound and finished so that when it is not subjected to any stress it has an external diameter slightly larger than the diameter of the recesses of the cups 12 and 13. As a result, the spring bears against the cylindrical walls of the recesses when in place therein.

If the two shafts 10 and 11 tend to rotate relatively in the direction which would cause the spring 15 to unwind, the spring tends to expand and is forced firmly against the walls of its associated recesses to clutch together the two shafts 10 and 11. If the shafts 10 and 11 rotate relatively in a direction to wind the spring, the spring decreases in diameter and recedes from the walls of the recesses to permit free relative rotation of the two shafts.

My improved spring for use in such a clutch is wound from wire having two opposite and parallel flat faces which are separated by two convexly curved surfaces. Such a wire may conveniently although not necessarily be formed by passing ordinary round spring wires between rolls. The spring is formed by winding this wire upon a rotating mandrel 17, the end of the spring being in engagement with a shoulder or collar 18 on the mandrel. As the wire 16 is fed to the rotating mandrel, it may be drawn to the left slightly (Fig. 2) so that it partially overlaps the adjacent spring turn. By virtue of the convexly curved surfaces which are thus caused to abut the wire 16 will be forced axially far enough so that it can be drawn against the mandrel 17. Inclining the wire 16 backward to produce this temporary overlapping as it is fed on to the mandrel produces a spring that is very tightly wound, and the elasticity of the spring wire tends to hold the spring-turns together.

This method of winding the wire, which is greatly facilitated by having the inner surface thereof convex, strains the wire transversely of itself and longitudinally of the completed spring. This straining occurs by reason of the backward inclination of the wire as it is fed onto the mandrel 17 during the winding of the spring, the wire first being bent backward and then straightened out into contact with the adjacent turn of the completed spring. In the completed spring, therefore, there is an elastic force which operates to force the axial surfaces of adjacent spring turns together and tends to prevent elongation of the spring.

After winding, the exterior surface of the spring is finished to a desired diameter as indicated in Fig. 3. In thus finishing the spring, the entire convex outer surface of each spring turn is not entirely removed. As a result, there is left between spring turns V-shaped grooves 20. These grooves provide convenient spaces for the reception of lubricant and also provide spaces in which may be collected any grit or foreign matter which finds its way into the clutch and which would damage the engaging surfaces of the spring and its associated recesses if permitted to remain between such engaging surfaces. In providing for the reception of lubricant, these grooves act to facilitate the breaking down of any oil film that may collect between the spring and the clutch members while such parts are at rest.

The interior surface of the spring is not finished, and the grooves formed by the convexly curved inner faces of adjacent spring turns aid in leading lubricant between adjacent spring turns, the lubricant thus entering between the turns being fed outward by capillary attraction and centrifugal force to the engaging surfaces of the spring and its associated recesses.

I have found that in order to secure the best results with a clutch of the type illustrated the adjacent turns of the coil spring should be in contact. The constant stressing of the spring to which it is subject when in use has a tendency to elongate the spring and to cause a separation of successive turns. By winding my spring in the manner described I stress it so that there is an appreciable elastic force tending to hold adjacent spring turns in contact, and I thus counteract the tendency of the spring to elongate.

I claim as my invention:—

1. In combination, two relatively rotatable parts, an axial circular recess in one of said parts, a helical spring located in said recess and operatively engaged with the other of said parts so that said spring will expand and clutch said two parts together when they tend to rotate relatively in a direction to unwind said spring, the wire from which said spring is wound being strained transversely of itself and longitudinally of the spring so that adjacent turns of said spring will be forced together.

2. In combination, two relatively rotatable co-axial members, an axial recess in one of said members, and a helical spring located in said recess and operatively connected to the other member, said spring being wound from wire having two parallel plane faces which form the axial surfaces of spring turns in the wound spring, adjacent turns of said spring being in contact with each other and said spring being provided in its outer surface with a helical groove.

3. In combination, two relatively rotatable co-axial members, an axial recess in one of said members, and a helical spring located in said recess and operatively connected to the other member, said spring being wound from wire having two parallel plane faces which form the axial surfaces of spring turns in the wound spring, adjacent turns of said spring being in contact with each other, at least one of the outer corners of the wire from which said spring is wound being bevelled to form a helical groove.

4. In combination, two relatively rotatable co-axial members, an axial recess in one of said members, and a helical spring located in said recess and operatively connected to the other member, said spring being wound from wire having two parallel plane faces which form the axial surfaces of spring turns in the wound spring, such wire also having a convex face which forms the inner surface of the wound spring.

5. In combination, two relatively rotatable co-axial members, an axial recess in one of said members, and a helical spring located in said recess and operatively connected to the other member, said spring being wound from wire having two parallel plane faces which form the axial surfaces of spring turns in the wound spring, adjacent turns of said spring being in contact with each other, said spring being provided on its inner surface with a helical groove.

6. In combination, two relatively rotatable co-axial members, an axial recess in one of said members, and a helical spring located in said recess and operatively connected to the other member, adjacent turns of said spring being in surface contact with each other and free to move relatively to each other, said parts being arranged so that when said two members tend to rotate relatively in a direction to unwind said spring the outer surface thereof will be forced into firm frictional engagement with the cylindrical surface of said recess, one of said engaging surfaces being provided with one or more pockets for the reception of lubricant or foreign matter.

7. In combination, two relatively rotatable co-axial members, an axial recess in one of said members, and a helical spring located in said recess and operatively connected to the other member, adjacent turns of said spring being free to move relatively to each other, said parts being arranged so that when said two members tend to rotate relatively in a direction to unwind said spring the outer surface thereof will be forced into firm frictional engagement with the cylindrical surface of said recess, at least one of the outer corners of the wire from which said spring is wound being bevelled to form a helical groove, the outer face of each spring turn being cylindrical for a portion of its width to have surface contact with the wall of said recess when said spring is expanded.

In witness whereof, I have hereunto set my hand at Indianapolis, Indiana, this 3d day of December, A. D. one thousand nine hundred and twenty-five.

WILLIAM CARLETON STARKEY.